United States Patent [19]

Todd, Jr. et al.

[11] Patent Number: 4,647,464
[45] Date of Patent: Mar. 3, 1987

[54] HOP FLAVOR CONSTITUENTS ADSORBED ON FUMED SILICON DIOXIDE

[75] Inventors: Paul H. Todd, Jr.; James A. Guzinski, both of Kalamazoo, Mich.

[73] Assignee: Kalamazoo Holdings, Inc., Kalamazoo, Mich.

[21] Appl. No.: 647,101

[22] Filed: Sep. 4, 1984

[51] Int. Cl.$^4$ .................. C12C 3/00; C12C 11/00
[52] U.S. Cl. ........................ 426/423; 426/16; 426/600; 426/651
[58] Field of Search ............. 426/29, 16, 600, 651, 426/655, 423

[56] References Cited

U.S. PATENT DOCUMENTS 3,433,642  3/1969  Nakayama et al. ............. 426/423
3,486,906  12/1969  Todd ........................... 426/600

FOREIGN PATENT DOCUMENTS 0751346  11/1970  Belgium ......................... 426/600

OTHER PUBLICATIONS

The Condensed Chemical Dictionary, 10th Ed., Van Nostrand Reinhold Co. Inc.; 1981, pp. 919–920.

Primary Examiner—David M. Naff
Assistant Examiner—William J. Herald
Attorney, Agent, or Firm—Gordon W. Hueschen

[57] ABSTRACT

Precise control of hop aromatic flavors and hop bitter acids in beer is achieved by adsorbing these hop flavors on fumed silicon dioxide and dosing the fumed silicon dioxide containing adsorbed hop flavor into beer, preferably after suspending the fumed silicon dioxide containing the adsorbed flavors in an aqueous medium. The hop flavors are desorbed in the beer and fumed silicon dioxide solids become available as a clarifying agent and are subsquently filtered from the beer.

12 Claims, No Drawings

HOP FLAVOR CONSTITUENTS ADSORBED ON FUMED SILICON DIOXIDE

BACKGROUND OF THE INVENTION

Hops contribute two basic flavor notes to beer (including ale): bitterness, contributed by the isohumulones and hulupones and other minor bitter acids; and aromatic notes, contributed by hop oil constituents (generically considered to be terpenoids for the purposes of this specification). Traditionally, hops high in alpha acids are added at the outset of wort boiling, to convert the alpha acids to bitter hop acids. Aromatic hops are added late in the boil, after the boil, or even after fermentation, to incorporate the terpenoid constituents responsible for giving beer a so-called hoppy aroma and flavor. This flavor is particularly characteristic of the finest premium beers, where the inefficiencies of late hopping (in which the alpha acids are poorly utilized) are not a problem because the beer is marketed at premium prices.

For example, a premium beer is typically made by adding a high alpha hop or hop extract at the beginning of wort boil, and adding aroma hops towards the end and/or after the boil. Even then, a large portion of the aroma is lost in boiling or subsequent fermentation. A hop oil is a mixture of perhaps two hundred compounds, of which terpene hydrocarbon, alcohols, ketones, some esters, and epoxides are important constituents. The balance among these constituents controls the flavor and aromatic qualities of the beer. In conventional hopping, as described above, reproducibility is only marginal at best, for not only is there lot to lot variation in the hops, uncertainty as to the amount of the various terpenoids which will be lost in the fermentation and storage of the beer (and the proportions lost are related to the degree of water solubility of the terpenoids), but the aroma and flavor is also related to the length of time the hops have been stored. Freshly harvested hops are known to give a different flavor than year-old hops.

Accordingly, efforts to overcome these control problems have been made in recent years by carefully extracting hops aromas with carbon dioxide, by making emulsions of these oils and aroma using Polysorbate 80 TM (polyoxyethylene (20) sorbitan mono-oleate), and also by adding the oils as a portion of isohumulones as described as an option in U.S. Pat. No. 3,486,906 (Todd). Each of these efforts has its shortcoming. The Polysorbate emulsions introduce Polysorbate into the beer, which can become rancid and objectionable in such a delicately flavored system as well as potentially requiring label disclosure. The isohumulone emulsions may not be stable, and the hop oil may float out, so that it does not dissolve in the beer. Gum emulsions present the same potential difficulty and uncertainty. So do dispersions of hop oil on a water-soluble substrate, such as dextrose. It is well known to the art that spice flavorings may be dispersed on dextrose, and the dispersions added to a food such as sausage as a flavoring. Such a system has never been practical for hop flavors, since the oils and bitter acids tend to float out in the beer, and are not uniformly dissolved. Thus both efficiency is lost, and objectionable "hot spots" of flavor may be present.

It must be taken into account that hop oil is present in beer at levels of about one part per million, and the individual constituents at the part per billion level. A beer without some hop oil tends to be grainy or cardboardy; with these constituents it can be aromatic, floral, full bodied, etc., with a masking of the grainy notes and much more exciting to the palate and nose. However, when the oil in total approaches two parts per million, or its most readily detected constituents more than perhaps 200 or 300 parts per billion, it can be objectionable. And, compounding the difficulty of control is the lack of any precise assay for the part per billion level of specific terpenoids in the beer. Organoleptic evaluation is the only tool, and it is of course highly subjective and imprecise.

Accordingly, a method by which a carefully tailored hop oil, of known terpenoid composition, can be reproducibly and economically introduced into the beer, without introducing non-hop constituents or resulting in objectionable flavors, will be of great advantage to the art of brewing. It is an object of this invention to provide such a method.

Of particular interest is the application of this invention to the micro-brewer or home brewer, who does not pasteurize his beer. When such brewers add hops to their beer following fermentation, to achieve a "dry hop" character, microorganisms are introduced which can spoil the beer. The flavors of this invention are sterile, and thus permit dry hopping without danger of infection.

OBJECTS OF THIS INVENTION

This invention has as an objective the achievement of precise hop flavor additions to beer by introducing aromatic flavoring fractions into the beer following fermentation by adding a hop flavoring absorbed on fumed silicon dioxide to beer, preferably as a dispersion in an aqueous medium. The hop flavor adsorbate and dispersion consists essentially of hop oils carefully tailored to the particular beer, and/or optionally other top flavor constituents such as hop bitter acids or non-volatile, non-bitter hop flavors, admixed with and adsorbed upon fumed silicon dioxide. Additional objects will become apparent hereinafter, and still other objects will be apparent to one skilled in the art.

SUMMARY OF THE INVENTION

In summary, then, what I believe to be my invention includes the following:

A composition consisting esentially of fumed silicon dioxide which contains between 0.015% and 35% w/w of hop flavor constituents adsorbed thereon and which is useful for admixing with beer prior to final filtration thereof, and such a composition in the form of an aqueous dispersion thereof; a composition consisting essentially of an isoalpha acid adsorbed on fumed silicon dioxide, and such a composition in the form of an aqueous dispersion thereof; a composition consisting essentially of non-acidic hop resins adsorbed on fumed silicon dioxide, and such a composition in the form of an aqueous dispersion thereof, all such compositions containing also up to 60% w/w of at least one of ethanol, propylene glycol, and glycerine; a composition consisting essentially of a mixture of at least one of propylene glycol, glycerine, and ethanol with a hop oil, said mixture being adsorbed, in an amount of up to about 20% by weight of hop oil per total weight of adsorbate, on fumed silicon dioxide; and such a composition in the form of an aqueous dispersion thereof; as well as a process for introducing hop aromatic flavor into beer which comprises the steps of admixing said flavor with fumed silicon dioxide to adsorb said flavor thereon, dosing the beer with said adsorbate mixture to release said flavor and to clarify said beer, and thereafter subjecting said beer to filtration for removal of silicon solids from the beer, and such a process wherein said adsorbate mixture is dispersed in an aqueous medium before dosing into the beer.

THE INVENTION

A hop oil and/or hop bitter acids may be adsorbed on a fumed silicon dioxide and metered, preferably as an aqueous suspension but optionally as a solid, into the beer prior to final filtration, where the hop terpenoids will become desorbed from the fumed silicon dioxide and dissolved in the beer at a uniform level, thereby providing a reproducible flavoring system for the brewer. A secondary advantage of this discovery is that the fumed silicon dioxide is essentially a free substrate to the brewer, since silica is already commercially employed as a clarifying agent in the beer at this point in the brewing process.

It is well known to the brewing art that silicon products are strong adsorbents, and indeed they are presently used for that purpose in beer. What is most unexpected about this invention is the fact that the hop oils and/or hop bitter acids, which are strongly adsorbed on the funds silicon dioxide before introduction into the beer, are uniformly desorbed in the beer, the silica then becoming available in the beer as a clarifying agent. This is all the more surprising in view of the fact that the oils are not desorbed and do not float out of a dispersion of fumed silicon dioxide in water, which is subsequently dosed into the beer. However, if the oils and fumed silicon dioxide are separately added to the water, the oils float and uniform dispersion into the beer is not possible. It is therefore essential that the oils be dispersed on and adsorbed by the fumed silicon dioxide before dosing, or before placing into an aqueous medium for dosing, into the beer. This unexpected irreversibility of the mixing sequence is at the heart of this invention.

By way of further description of the process: The hop flavors are adsorbed on fumed silicon dioxide; these are then preferably dispersed in water, where the hop oils do not desorb and float out but remain suspended with the fumed silicon dioxide; the suspension is dosed into beer; the fumed silicon dioxide releases the hop oils and can then adsorb haze-forming compounds; the beer is filtered and the silica and adsorbed haze-forming materials are thereby removed whereas the hop oils, dissolved in the beer, contribute the desired aromatic qualities to the beer.

The following examples are given by way of illustration only and are not to be construed as limiting.

EXAMPLE 1

A hop oil of known and controlled composition is admixed at a 1% w/w level with and adsorbed upon a fumed silicon dioxide. This adsorbate is in turn diluted with water or beer to a concentration of 1% (w/v) with agitation, and remains in suspension without the hop oils coming to the surface. This dilution, containing 0.01% hop oil w/v, is metered into the beer as it moves into storage, or into a holding tank prior to final filtration and for clarification, at a rate sufficient to give the desired level of hop oil in the beer—normally at a rate of about 1% v/v to give a concentration of one part per million in the beer. During the contact time, which is preferably several hours or more, the hop oil is desorbed and the fumed silicon dioxide acts as a clarifying agent for the beer in the normal manner, whereafter the silicon solids are removed by filtration.

Alternatively, the hop oil adsorbed on the fumed silicon dioxide may be added directly to beer in a holding tank, provided there is sufficient agitation to disperse the fumed silicon dioxide-oil mixture and obtain uniform desorption of the oil into the beer.

EXAMPLE 2

A beer is made with a non-aroma hop, and it is desired to add a "noble" hop aroma to it. These aromas are considered by the art to be due to terpenoid epoxides, and an acceptable level in the beer is on the order of 300 parts per billion. The epoxides are carefully fractionated from a hop oil, admixed with and adsorbed upon fumed silicon dioxide at a 0.3% w/w level, and then introduced into the beer as in Example 1.

Alternatively, the concentration of flavor on the fumed silicon dioxide may be increased to even 15-20% w/w, and the subsequent dilution into the beer then increased fifteen to twenty times to achieve the desired flavor level.

It is obvious to one skilled in the art that the concentrations of oils, silica, and aqueous phase are subject to wide variations depending on the precision of the dosing equipment available to the brewer. However, in general, the more dilute the solutions or mixtures being used, the more precise the results. This is simply because the amounts desired are so small, and the flavor effect of poor control so great, that some inconvenience of handling greater volumes is more than offset by greater flavor assurance.

EXAMPLE 3

For the introduction of a hop bitter acid into beer, a liquid solution consisting of 35% potassium tetrahydroisoalpha acid, 20% ethanol, 20% glycerine, and the balance water, at a pH of about 8 to 9, was admixed with and adsorbed upon fumed silicon dioxide at a rate of 10% w/w. It remained a dry powder. This adsorbate powder, in turn, was slurried with water at a level of 5% w/v, which slurry in turn was dosed into beer at a rate of $\frac{1}{2}$% v/v. Following 12 hours of storage, the beer was filtered. It was found that 95% of the tetrahydroisoalpha acid was present in the beer, using the established techniques prescribed by the American Society of Brewing Chemists.

Alternatively, a 40% solution of isohumulone, as the potassium salt, dissolved in water and/or propylene glycol, is mixed with an equal weight of fumed silicon dioxide (dry weight basis), and dosed into beer as a premix in water or beer, or dosed directly into a holding tank with agitation. Although the concentration of hop bitter acid is 20% in the mixture, utilizations of greater than 90% can be achieved. At a concentration of 30%, which is considered the upper limit of this invention, utilization begins to fall.

EXAMPLE 4

For the introduction of both a hop bitter acid and hop oil into a beer, an iso-alpha acid (produced by heating an alpha acid salt and optionally diluting with ethanol and/or propylene glycol to assist dispersion) was mixed with one part hop oil to ten parts hop acid. This mixture was then admixed with and adsorbed upon fumed silicon dioxide to the extent of 15% w/w of iso-alpha acid.

The adsorbate remained a powder. This product was utilized as in Example 3, but the dosing rate was ¼% v/v into the beer. Utilization of the iso-alpha acids was 90% by analysis.

EXAMPLE 5 (A preferred embodiment)

Five (5) grams of hop oil and 45 grams of propylene glycol were mixed. Although a two-phase liquid, it was dispersible and adsorbed at a 50% w/w level on fumed silicon dioxide, to give a dry powder adsorbate. This adsorbate dispersion, when mixed at a 1% w/v level with water, did not show significant float out. This is an unexpected result, as it would seem that the propylene glycol, in which the hop oil is quite insoluble, should desorb the oil from the silica due to its polarity. This is not the case. Glycerine, as well as ethanol, can be substituted for the propylene glycol, which latter is, however, preferred. Up to 60–65% of the total composition may be hop oil and propylene glycol, glycerine, and/or alcohol before it becomes too pasty to use easily.

These hop oil mixtures are completely compatible with the hop bitter acid mixtures of the previous examples, providing a total blended flavor for post fermentation addition for the brewer.

In conclusion, from the foregoing, it is apparent that the present invention provides a novel method for the attainment of precise hop flavor in a beer, including ale, involving a uniform hop-flavoring system, as well as novel adsorbates of hop flavors upon fumed silicon dioxide, and aqueous dispersions thereof, which are useful for the said purposes, and all having the foregoing enumerated characteristics and advantages.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope of the appended claims.

I claim:

1. A composition useful for admixing with beer prior to final filtration consisting essentially of fumed silicon dioxide which contains adsorbed thereon between 0.015% and 35% w/w of hop oil or a mixture of hop oil and a hop flavor constituent selected from the group consisting of an iso-alpha acid and a non-acidic hop resin.

2. A composition of claim 1 in the form of an aqueous dispersion thereof.

3. A composition consisting essentially of an iso-alpha acid and hop oil adsorbed on fumed silicon dioxide.

4. A composition of claim 3 in the form of an aqueous dispersion thereof.

5. A composition consisting essentially of non-acidic hop resins and hop oil adsorbed on fumed silicon dioxide.

6. A composition of claim 5 in the form of an aqueous dispersion thereof.

7. A composition according to claim 1, 2, 3, 4, 5, or 6 containing also at least some and up to 60% w/w of at least one of ethanol, propylene glycol, and glycerine.

8. A composition consisting essentially of a hop oil adsorbed on fumed silicon dioxide.

9. A composition consisting essentially of a mixture of at least one of propylene glycol, glycerine, and ethanol with a hop oil, said mixture being adsorbed on fumed silicon dioxide in an amount of at least some and up to about 20% by weight of hop oil per total weight of composition.

10. A composition of claim 9 in the form of an aqueous dispersion thereof.

11. A process for introducing hop aromatic flavor into beer which comprises the steps of admixing hop aromatic flavor including hop oil with fumed silicon dioxide to adsorb said flavor thereon, dosing the beer following fermentation with said fumed silicon dioxide containing hop aromatic flavor including hop oil to release said flavor and to clarify said beer, and thereafter subjecting said beer to filtration for removal of fumed silicon dioxide solids from said beer.

12. A process of claim 11 wherein said fumed silicon dioxide containing hop aromatic flavor including hop oil is dispersed in an aqueous medium before dosing into the beer.

* * * * *